March 5, 1963   G. C. MAYFIELD   3,080,172
PISTON RING ASSEMBLIES
Filed Sept. 15, 1960   2 Sheets-Sheet 2
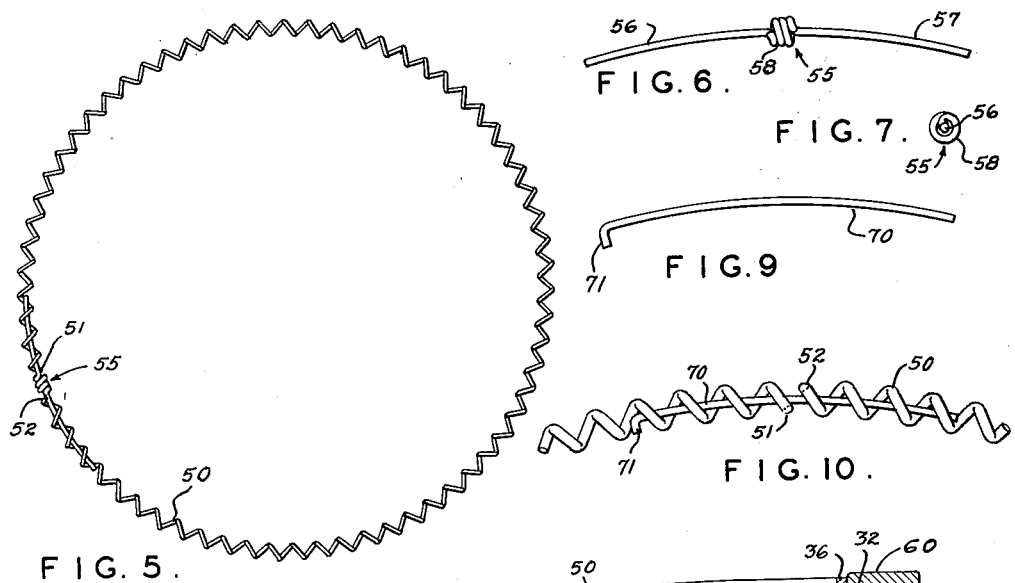
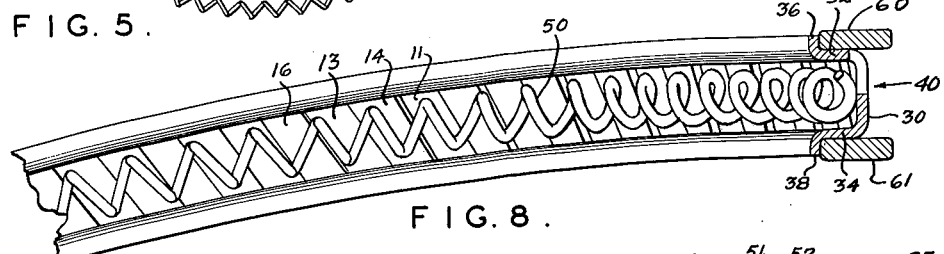
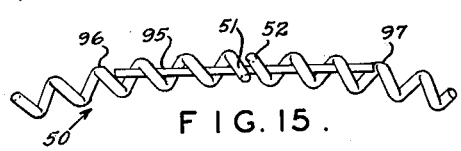
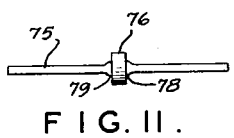
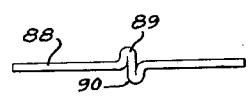
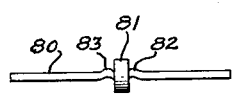
INVENTOR.
GEORGE C. MAYFIELD
BY
Sutherland, Polster & Taylor
ATTORNEYS United States Patent Office 3,080,172
Patented Mar. 5, 1963

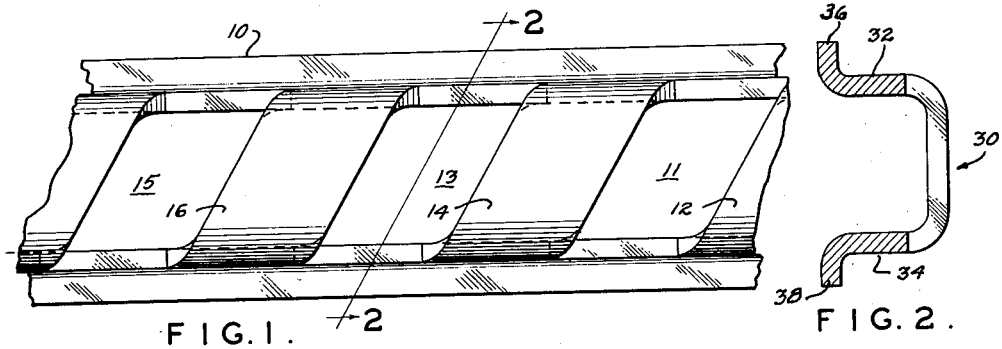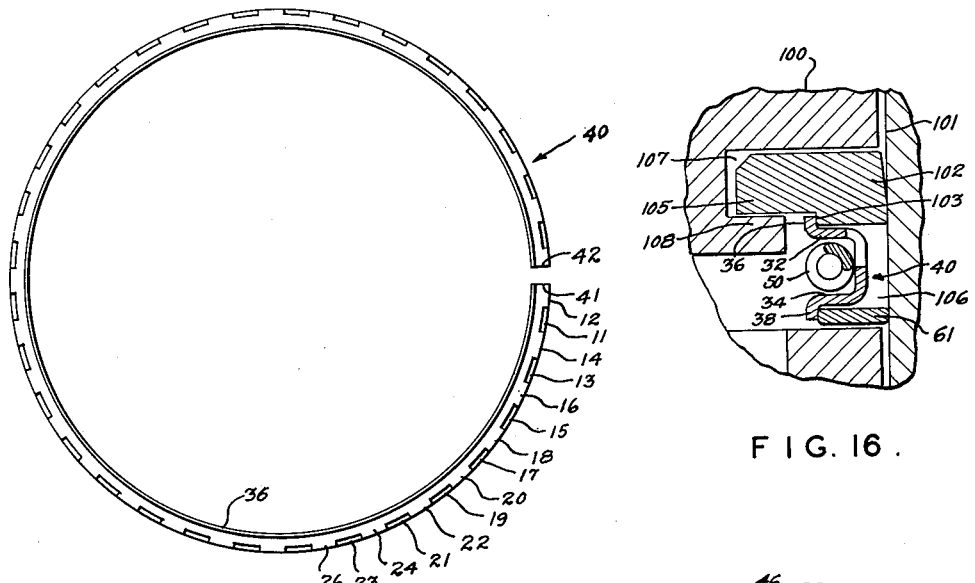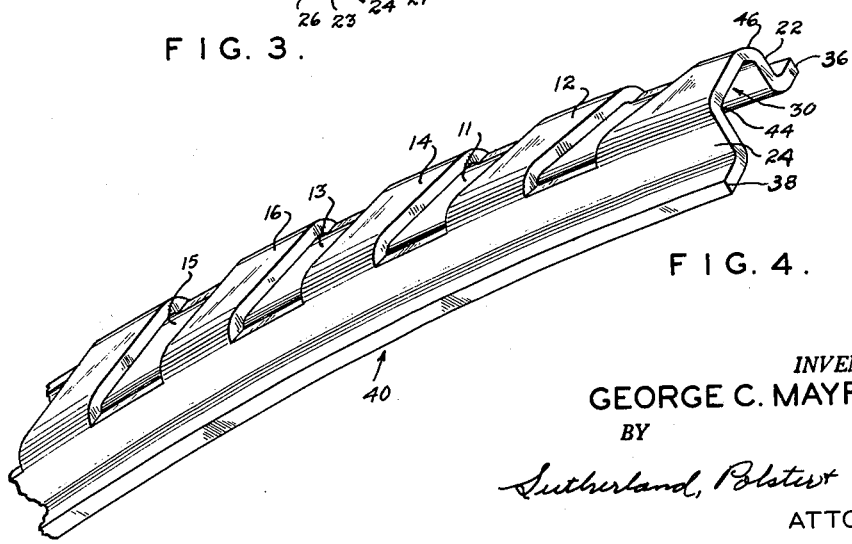

3,080,172
PISTON RING ASSEMBLIES
George C. Mayfield, Richmond Heights, Mo., assignor to McQuay-Norris Manufacturing Company, St. Louis, Mo., a corporation of Delaware
Filed Sept. 15, 1960, Ser. No. 56,223
4 Claims. (Cl. 277—141)

This invention relates to multi-piece piston ring assemblies and more specifically to the type of piston ring assembly in which piston rings or rails are supported in axially spaced relation in a piston ring groove by a backing ring or spacer ring and a radial control force is applied to the piston rings by a circular coil spring held compressed inside the backing ring or spacer. The piston ring assembly is primarily intended for use as an oil control ring on a piston for the internal combustion piston engine, but, of course, the kind of ring elements in the assembly are not material to the invention.

According to this invention, this piston ring assembly is full-floating and non-bottoming in the piston ring groove and includes expansible and contractible piston ring elements of suitable design supported in the ring groove of the piston in spaced relation by the backing ring or spacer ring element. The assembly also has an expansible and limited contractible backing ring which is channel-shaped in cross-section with a cylindrical wall or web and annular diametrically inwardly directed flanges or legs at opposite edges of the cylindrical wall. At the inner periphery of each annular flange or leg are rims extending oppositely in an axial direction to engage the inner periphery of the piston rings when supported between the outer surface of the annular flanges or legs and the inner radial face of the piston ring groove. The pressure control ring of this assembly is a plain round coil spring with a preselected free length formed into an annulus by means holding the opposite ends of the coil spring in abutting relation. In accordance with usual practice, the free length of the annular coil spring is longer than the inner circumference of the cylindrical wall of the backing ring when this ring is in operating relationship in the assembly, and, consequently, the annular coil spring is compressed circumferentially so that it exerts a continuous expansive force radially outwardly on the cylindrical inner wall of the backing ring, which force is uniform around the inner periphery of the cylindrical wall of the backing ring. Like expansion forces are imposed by the rims of the backing ring on the piston ring.

To obtain a circumferentially uniformly distributed expansive force from an annular coil spring, it is necessary that the ring assembly as a whole and the backing ring in particular have sufficient flexibility to accommodate the very small variations in cylinder wall contour from true cylindrical shape, and that sliding friction between the elements of the ring assembly be held to a minimum especially at the bearing surfaces between the backing ring and annular coil spring. The first requirement, flexibility, is obtained by slotting the backing ring so that the slots extend across the cylindrical wall of the backing ring and into the flanges. Both the cylindrical wall and the annular flanges thereon must be readily capable of flexing radially about their circumference. This is not, however, possible to accomplish by reasonable radial forces, such as those exerted by the annular coil spring, unless both the cylindrical wall and the annular flanges thereon are skeletonized to some extent even though formed of a spring strip of metal. The aforementioned slots should extend from in the cylindrical wall of the backing ring continuously into the flanges, otherwise the rigidity inherent in the corner bends between the cylindrical wall and the annular flanges thereon would defeat any degree of circumferential flexibility. Slotting in this manner obtains the necessary static flexibility. However, the slotted surface was not regarded by others working in this field as compatible with obtaining the low degree of friction at bearing surfaces between the backing ring and annular coil spring. Consequently, others have proposed contoured seats for the spring or wider webs between the slots. It has been discovered that these constructions are not always satisfactory and that far better dynamic response to change in shape, with a like degree of spring expansive force, can be obtained by allowing the round coil spring to roll on a cylindrical surface when it is working. Contrary to what others have proposed, point contact at the bearing surfaces between the ring and the spring minimizes friction and improves dynamic response and interference of the edges of the slots with the action of the annular coil spring can be completely eliminated by changing the wire size in the spring and changing the angle of the slots with respect to the ring axis.

Accordingly, the coil spring has a diameter coil small enough so that the coil can roll on the cylindrical wall of the backing ring due to clearance between the outside of the coil and the inside of the annular flanges, and the wire size in the coil spring is relatively large with respect to coil size to give a stable annular shape. The slots in the cylindrical wall are inclined with respect to the axis of the backing ring in a direction opposite to the lay of the wire in the coils at the bearing surfaces between the cylindrical wall of the backing ring and the coil. When the slots in the cylindrical wall are so inclined, the webs between can be of any width without the spring catching. Since the wire size is large and the coil size provides for some rolling motion, coil spring movement, which will be three times greater than changes in diameter of the assembly, is floating on the webs, and over the slots, with a minimum of friction giving maximum uniformity of control pressure circumferentially about the piston ring.

It is an object of this invention to provide a piston ring assembly in which uniform radially directed forces are imposed on the piston rings and cylinder walls which is uniform about the circumference of the piston rings and cylinder walls.

It is another object of the invention to provide a backing ring with uniform flexibility throughout its circumference so as to eliminate points of high pressure of the piston rings along the cylinder wall.

It is still another object of this invention to provide a piston ring assembly with a circumferentially compressed annular coil spring which applies a radial force to an interrupted surface on a piston ring constructed to minimize friction and interference with the coils of the spring.

Further objects and advantages of this invention will appear from the following which is a full, clear and exact description of the invention when taken with the accompanying drawings forming a part thereof in which:

FIG. 1 is a plan view of a formed and punched spring strip of metal from which one of the ring elements of the piston ring assembly is formed;

FIG. 2 is a transverse section taken on the line 2—2 of FIG. 1;

FIG. 3 is a top plan view of the strip of metal, such as shown in FIG. 1, after it is formed into a ring;

FIG. 4 is a perspective view of a portion of the ring shown in FIG. 3;

FIG. 5 is a top plan view of an annular coil spring with means for connecting its opposite ends so as to form the control element for a piston ring assembly according to this invention;

FIG. 6 is a plan view of a connector, such as shown in FIG. 5, on an enlarged scale;

FIG. 7 is an end view of the connector shown in FIG. 6;

FIG. 8 is a perspective view of a piston ring assembly according to this invention with the parts broken away so as to illustrate the relationships therebetween;

FIG. 9 is a plan view of a modified form of connector;

FIG. 10 is a plan view of the manner in which the connector of FIG. 9 is used to connect opposite ends of an annular coil spring;

FIGS. 11 through 14, inclusive, illustrate modified forms of connectors for the opposite ends of an annular coil spring;

FIG. 15 is a top plan view of end portions of an annular coil spring illustrating another form of connector for the ends; and FIG. 16 is a vertical fragmentary section through a portion of a piston and cylinder wall illustrating the backing ring of this invention in a different application.

The strip 10 shown in FIG. 1 is a strip of spring metal which is first punched to form a series of spaced slots indicated by the odd reference characters 11, 13, 15, 17, etc. Between these slots are left the flat web portions indicated by the even reference characters 12, 14, 16, etc. Because each of the slots 11, 13, 15, etc., are inclined transversely of the strip 10, the webs 12, 14, 16, etc., are left with inclined edges transversely of the strip. Preferably this operation is done while the strip 10 is flat. After the punching operation, the strip is rolled into a channel-shape, such as shown in FIGS. 1 and 2, so that the webs 12, 16, etc., form the bottom 30 of the channel, and flanges 32 and 34 form the legs or flanges of the channel. The ends of the flanges 32 and 34 are bent into rims 36 and 38 which may be substantially parallel with the surface 30 formed by the webs 12, 14, 16, etc.

A strip 10 is thereby formed by the above-named operations, which is channel-shaped, with upstanding rims at the edge of the flanges 32 and 34, and a slotted backbone 30 formed by the webs 12, 14, 16, etc., which have substantially parallel edges and are inclined diagonally and transversely of the strip 10.

Subsequent forming operations on the strip 10 cut the strip to the proper length and roll it into the shape shown in FIG. 3 to form a backing ring for the piston ring assembly, indicated generally as 40. Since the strip 10 was of spring metal, the ring 40 will have inherent resiliency which will allow expansion of the ring 40 and limited contraction of the ring 40 because of the space between the ends 41 and 42. The ring 40, formed from rolling the strip 10, has a cylindrical surface 30 formed by a plurality of webs, such as 12, 14, 16, etc. These are separated by slots, such as 11, 13, 15, etc. As shown in both FIGS. 3 and 4, the slots 11, 13, and 15 and the webs 12, 14 and 16 are each inclined transversely of the strip 10, so that when formed into the ring 40, these slots and webs will be inclined with respect to the axis of the cylindrical ring 40. Slots 11, 13, 15, etc., as will be noted from FIGS. 3 and 4, extend across the cylindrical surface, generally indicated as 30, and into the upper and lower annular flange portions 32 and 34 of the ring 40. The particular degree in which the slots extend into the annular flanges determines the degree of flexibility in the annular ring 40. In every case, however, it is contemplated that whatever the shape or design of the slots, or in turn the webs formed by the slots, at least some of them will extend through the corners 44 and 46 of the ring so as to eliminate the rigidity contributed by the corner bends. Cylindrical wall 30 of the backing ring 40 directly receives the pressure from an annular coil spring 50, shown in FIG. 5. The ring 50 is of relatively conventional construction formed of spaced helical coils of spring wire. The wire size relative to the coil size is chosen to be relatively large for reasons which will appear hereinafter. Opposite ends of the spring 50 are connected by a device, such as illustrated in FIGS. 6 and 7, for example. The connector, generally indicated as 55, therein, has curved ends, such as 56 and 57, interconnected by one or more loops 58 located intermediate the straight ends 56 and 57. These loops are preferably the same diameter as the helical coil spring 50. Ends 56 and 57 are inserted within the coils of the helical spring 50 and loosely received therein, so that abutting ends of the coil spring 50, such as 51 and 52, come into abutting relation with opposite ends of the loops 58 of the connector 55 thereby forming a stable support for the ends of the coil spring 50 against opposite sides of the loops 58.

Turning now to FIG. 8, backing ring 40 and particularly the cylindrical wall 30 thereof formed by the webs 12, 14, etc., directly receive the pressure from the outer surface of the coil spring 50 when it is compressed circumferentially within the piston ring assembly, as shown in this illustration. Parts of the connector have been omitted for clarity. Flanges 32 and 34 form the spacer support for the rails 60 and 61 which are the piston ring elements in the assembly. Usually these rails are split rings so as to be capable of expansion and limited contraction. Rims 36 and 38 bear directly against the inner periphery of the rails 60, 61, respectively, and thereby transmit any expansive forces imposed on the backing ring 40 directly to the rails 60 and 61 so as to urge the outer edges of the rails against the cylinder wall. The diameter of the coil spring 50 is so chosen that substantial clearance will exist between the coil spring 50 and the inner surface of the annular flanges 32 and 34 so as to permit the spring to roll on the cylindrical surface 30. Likewise, the spring wire diameter relative to coil size is chosen so that sufficient circumferential rigidity will exist in the coil spring to prevent it from deflecting into the slots 11, 13, 15, etc., to any appreciable extent. The wire size also has a material bearing upon the ability of the coil of the spring 50 to move freely over the inner surface of the cylindrical wall 30 formed by the webs 12, 14 and 16, etc. From FIG. 8, it will be apparent that the lay of the wire in the coils of the spring 50 is opposite to the inclination of the webs 12, 14, 16, etc., or stated another way, the lay of the wire in the coils of the spring 50 is inclined in the opposite direction from the edges of the slots 11, 13, 15, etc. Rolling motion of the spring permitted in this assembly facilitates its expansion and contraction while the relationship between the lay of the wire in the coil spring 50 and the edges of the web forming the cylindrical wall 30 prevent interference with expansion and contraction of the spring 50 with respect to the cylindrical wall 30. The coils of the spring, when so arranged, easily slide over the edges of the web with the minimum of friction.

FIGS. 9 and 10 illustrate another form of connector for the ends of the annular coil spring 50, which may be used in substitution for that shown in FIGS. 6 and 7, for example. According to these views, the connector 70 is of arcuate shape so as to freely slide into the coil at one end of the spring, such as 52. The opposite end of the connector 70 has an angularly directed end 71 which, as shown in FIG. 10, can be threaded into or between the coils of the spring 50 from the end 51 leaving sufficient length of the portion 70 of the connector exposed so as to form a guide received by the end 52 of the annular coil spring 50. The fact that the connector 70 is of generally arcuate shape will prevent its rotation once it is inserted in the ends 51 and 52, and there is no possibility that the connector 70 can be disengaged from either end by rotating axially.

In FIG. 11 is another form of connector which may be used between the ends of the coil spring 50. This connector has a straight rod 75 with a washer, such as 76, located intermediate its ends and staked in position by deforming the wire 75 at the points 78 and 79 on opposite sides of the washer 76. The rod 75 is inserted in the opposite ends 51 and 52 of the coil spring and in this position the washer 76 fixed intermediate the ends of the rod 75 forms an abutment for the ends 51 and 52 of the coil spring 50.

FIG. 12 shows a similar structure. A rod or wire 80 has a washer 81 located intermediate its end and fixed in position by kinking the rod or wire 80 at 82 and 83 adjacent opposite sides of the washer 81.

FIG. 13 shows another form of connector in which a straight wire or rod 85 is deformed at 86 intermediate its ends to form a kink of sufficient size so that it cannot slide into the end 51 or the end 52 of the coil spring 50. This prevents the rod 85 forming the connection from migrating out of position during flexing of the coil spring 50.

FIG. 14 shows a very similar device to FIG. 13 in which a straight rod, such as 88, is kinked in opposite directions at 89 and 90. The portions 89 and 90 prevent migration of the connector rod 88 from its position with the kinks 89 and 90 between the ends of the coil spring 51 and 52.

FIG. 15 illustrates still another manner of connecting the ends 51 and 52 of the annular coil spring 50. In this modification, a straight rod 95, or one with substantially little curvature, is inserted into the coils of the annular coil spring 50 with part of the rod projecting into the end 51 and part of the rod projecting into the end 52. The rod is selected so as to have a loose fit in the coils. In order to prevent the rod 95 from migrating from a position interconnecting the ends 51 and 52 of the coil spring 50, the coils, such as 96 and 97, for example, adjacent the opposite ends of the rod 95 are deformed by applying a force thereto to displace the coils 96 and 97 from the circular shape of the spring 50 so that the wire in the coils 96 and 97 forms an abutment adjacent the opposite ends of the connector wire 95. This prevents the wire 95 from moving further in one direction than the coil 96 or further in the other direction than the coil 97. Both coils will be located when deformed in a position forming stops.

Operation

In a piston ring assembly as constructed according to this description, the coil spring 50 is selected of proper length so that when compressed within the backing ring 40, it will exert a continuous radial force outwardly against the cylindrical wall 30 formed by the webs 12, 14, 16, etc. This radial force is in turn transmitted to the rails 60, 61 through the rims 36 and 38. Any irregularities or departures in the surface of the cylinder wall from true cylindrical shape will be in part compensated by the ability of the backing ring 40 to flex circumferentially thereby moving outwardly or inwardly, as the case may be, to move the rails 60 and 61 in a direction to keep the force applied to the cylinder wall by the rings substantially uniform. During this flexing action of the backing ring, coil spring 50 will likewise flex circumferentially. Changes in diameter in the cylinder are compensated for by expansion or contraction, as the case may be, of the rails 60, 61 and backing ring 40. These movements of the backing ring are, of course, transmitted to the coil spring 50 causing it to expand or contract circumferentially, and the fact that the coil spring 50 has freedom of movement between the annular radial flanges 32 and 34 minimizes any sliding friction at the bearing surfaces between the cylindrical wall 30 of the backing ring and the outer periphery of the annular coil spring 50. In other words, if there is any substantial resistance at these surfaces, the coil spring 50 is free to move to avoid the resistance and thereby maintain a uniform radial force on the backing ring 40. In other words, if there is some slight burr left on the backing ring from the punching operation, the movement of a coil against this burr would cause the spring to roll so as to avoid the interference between the burr and the surface of the coil spring. Unlike prior devices, the coil spring is not confined to any one path of bearing, but may freely float to select a freely operating position.

The embodiment shown in FIG. 16 uses the same backing ring as heretofore described and illustrated in FIGS. 1–5, and the same coil spring expander element shown in FIG. 5 used in the same way as illustrated in FIG. 8. The ring assembly also retains a single rail or oil control ring, and accordingly each of these elements is indicated by the same reference character. In this embodiment of the invention, the piston ring assembly includes a compression ring 102 with a section of reduced width 105 slideable in a portion 107 of a piston ring groove 106 of the piston 100. Portion 107 is separated from the ring groove 106 by a land 108. The lower face of the ring 102 has an annular shoulder 103 between the wider portion at the outer periphery next to the cylinder wall 101 and the narrower portion 105 in the portion 107 of the groove 106. This wider portion of the ring 102 has a lower face supported on the flange 32 of the backing ring 40 and the annular shoulder 103 engaged by rim 36 so that ring 102 is urged outwardly by the coil spring 50, and the spring constantly urges both ring 102 and 61 toward the cylinder wall 101. The slotted ring 40, because of its construction, has very little torsional rigidity which means that the expansive force of the coil spring 50 will be about equally divided between a top and bottom ring regardless of shape or size, and the rings may have slight relative radial movement without affecting the control force on either ring exerted by the coil spring 50. In this respect, the piston ring assemblies are the same.

Operation of this embodiment does not differ from that with two rails, except that it combines the function of a compression ring and an oil ring in a single ring assembly.

Changes in and modifications of the construction described may be made without departing from the spirit of my invention or sacrificing its advantages.

Having thus described the invention, what is claimed and desired to be secured by Letters Patent is:

1. In a piston ring assembly of the character having an annular member of channel section with the mouth of said channel section at its inner periphery and a series of circumferentially spaced webs about its outer periphery, and a circumferentially extending coil spring within the channel of said member engaging the interior of said webs and outwardly biasing the same, the improvement which comprises, the circumferential margins of said webs being oblique to the axial dimension of said member in the sense opposite that in which the web engaging portions of said spring are oblique to the axial dimension of said member.

2. The ring assembly of claim 1 wherein a ring element whose outer periphery makes edgewise engagement with a cylinder wall is engaged at its inner periphery by a part of said member whereby the outward biasing force of said spring is transmitted to said ring element.

3. The ring assembly of claim 1 wherein a pair of ring elements whose outer peripheries make edgewise engagement with a cylinder wall are spaced apart in the axial direction by said member, and said member has parts engaging the inner peripheries of said ring elements whereby the outward biasing force of said spring is transmitted to said pair of ring elements.

4. The ring assembly of claim 3 wherein the outside coil diameter of said spring is substantially less than the interior axial dimension of the channel to provide clearance for movement of said spring in an axial direction relative to said member to enable said spring to seek paths of minimum resistance to sliding movement relative to said member.

References Cited in the file of this patent

UNITED STATES PATENTS 2,779,647    Hamm  ---------------- Jan. 29, 1957

FOREIGN PATENTS 792,922    Great Britain ----------- Apr. 9, 1958